Dec. 5, 1967 R. H. ANDERSON 3,356,778
METHOD OF MAKING SEALS FOR PIPE JOINTS
Original Filed Aug. 1, 1962

INVENTOR.
RICHARD H. ANDERSON
BY
Meyer, Baldwin, Doran & Egan
ATTORNEYS

United States Patent Office 3,356,778
Patented Dec. 5, 1967

3,356,778
METHODS OF MAKING SEALS FOR
PIPE JOINTS
Richard H. Anderson, Dover, Ohio, assignor to The Robinson Clay Product Company, Akron, Ohio, a corporation of Maine
Original application Aug. 1, 1962, Ser. No. 213,939, now Patent No. 3,185,491, dated May 25, 1965. Divided and this application Nov. 23, 1964, Ser. No. 413,104
4 Claims. (Cl. 264—45)

This application is a divisional application of my copending application Ser. No. 213,939, filed Aug. 1, 1962.

The present invention relates to methods of making seals for pipe joints.

It is an object of the present invention to provide an efficient method of making a seal for a pipe joint without the use of molds that are ordinarily employed in the manufacture of pre-fabricated joints for clay sewer pipes, concrete cement sewer pipes, cast iron pipes, cement asbestos pipes, and the like.

It is an object of the present invention to provide an improved method of making a pre-fabricated pipe joint for clay sewer pipe and the like.

Other objects will be apparent from the description that follows, the appended claims and the drawings in which:

FIG. 1 shows one end member of one pipe that is a bell end, the other end member of the other pipe being a spigot end and an O-ring between the bell and spigot end members for assembling the two together;

Figure 1:
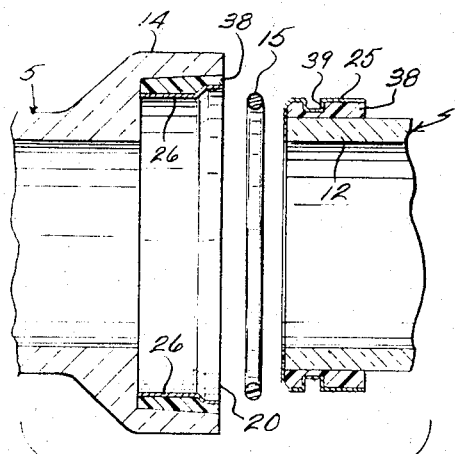
FIG. 1 is an exploded fragmentary side elevational view of the end members of two clay pipes of like construction before they are joined together.
Figure 2:
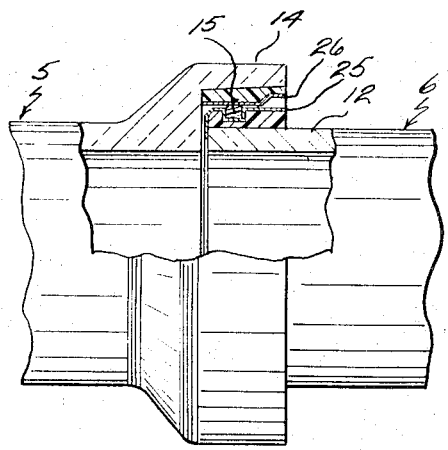
FIG. 2 is a side elevational and partly sectional view of the two clay pipes of FIG. 1 joined together to form a strong water tight bond therebetween.
Figure 6:
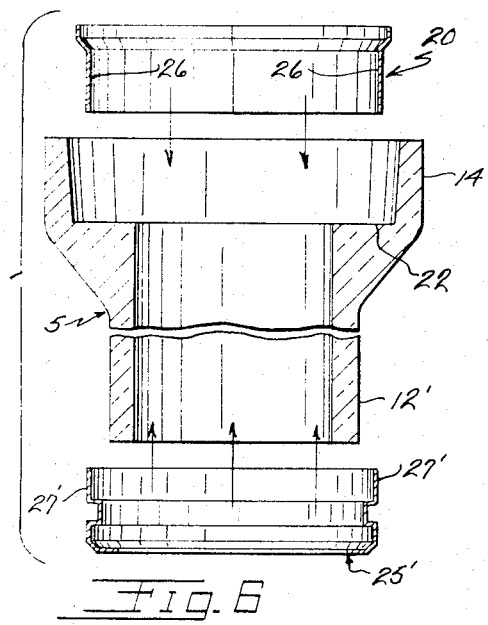
Figure 7:
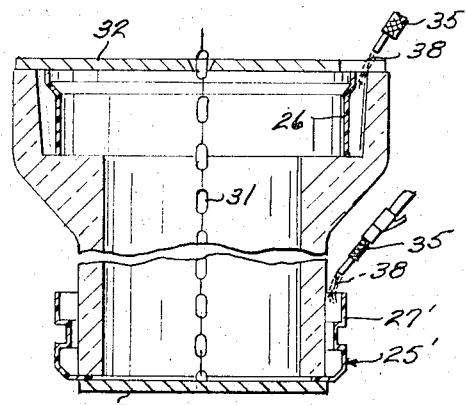

FIG. 6 is an exploded and partly sectional view of an upright length of clay pipe before the construction of seals for each end thereof and showing in exploded position the thin hard plastic shells that are to become a part of the final seal construction; and FIG. 7 is a fragmentary partly sectional view of the pipe of FIG. 6 assembled with the plastic shells, and showing hoses for applying a pourable back-up material such as asphalt or other suitable material between each shell and its associated pipe end to bond the shell thereto and form the strong water tight seals shown in FIGS. 1 and 2.

The present invention is directed to an improved method of efficiently making seals for pipe joints including clay sewer pipe joints without the use of expensive cast iron molds. The seal provides an excellent, tough, resilient water and chemical barrier for the sewer pipe joints.

The seals are preferably used in a push-type joint as illustrated in FIGS. 1 and 2 in which two pipes 5 and 6 of like construction are shown. As seen in these figs., a spigot end 12 of pipe 6 is pushed into sealing relationship with a bell or socket end 14 of pipe 5. An elastomeric O-ring 15 is slipped into a groove on the spigot end 12 before assembling the two pipes, the O-ring 15 being compressed in the final assembly joint as seen in FIG. 2 to make the same water tight.

Toroidal push-type joints are described in my U.S. Patent No. 2,816,782 in which the formation of seals from a polyvinyl chloride plastisol is described. Although excellent seals are obtained by the use of a polyvinyl chloride plastisol, which is one of the very few materials that make thoroughly satisfactory seals, as noted in the above mentioned patent, the formation of these polyvinyl chloride seals requires the use of expensive molds which adds to the manufacturing expense and the resultant seals made thereby must be protected for transportation.

In the present invention, excellent seals are provided for the push-type pipe joints without the use of molds and the resultant seals are ready for transportation without further protective measures.

The efficient mold-less method of forming the seals is illustrated in FIGS. 6 and 7. As seen in FIGS. 6 and 7, clay pipe 5 may be provided with the two component seals by assembling the same with a thin hard plastic shell 20 adapted to set on an annular ledge 22 of the socket end 14 and plastic shell 25' adapted to fit around spigot end 12'.

Shells 20 and 25' are readily manufactured by the rotational casting of polyethylene or polypropylene to close dimensions so that the resultant joint will fit together tightly and accurately. The shells may also be made by injection molding or blow molding. Thus, the inner surface 26 of shell 20 and the outer shell 27' of shell 25' are designed to fit together quickly and telescopically with slight clearance to form a water tight joint with the aid of the sealing O-ring 15—even though the clay or other pipes may not be perfectly round.

As seen in FIG. 7, the assembled upright pipe can be suspended from a moving conveyor by a chain 31 and an upper support bar 32 and a lower support plate 33. A hose 35 may be used to pour a liquid back-up material 38 between each of the plastic shells 20 and 25 and its associated pipe walls to bond the shells thereto. The liquid back-up material may be a material such as asphalt or a hot-melt synthetic resin composition, which when heated is pourable and when cooled becomes solid and water impermeable. In any case, it is self-bonding between the shell and the pipe.

When the liquid back-up material is solidified, the excellent two component seal comprising a thin hard plastic shell and a water resistant back-up material is formed as shown in FIGS. 1 and 2.

Thus, the spigot end 12 of pipe 6 (FIGS. 1 and 2) is provided with a two component seal comprising a shell 25 which is similar to shell 25' shown in FIGS. 6 and 7 and which is bonded to end member 12 by the solidified back-up material 38. The shell 25 is provided with an annular generally rectangular groove 39 that is radially spaced from the wall of pipe end 12 and is adapted to seat the compressed O-ring 15, as best seen in FIG. 3, to form a water tight joint between pipes 5 and 6.

Figure 3:
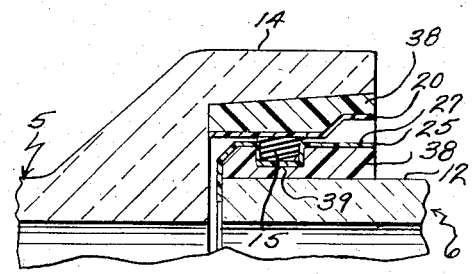
FIG. 3 is an enlarged sectional view of the upper portion of FIG. 2 showing the details of the water tight joint construction.
Figures 4, 5:
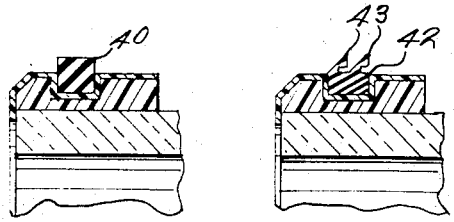
FIG. 4 is an enlarged sectional view of the upper portion of FIG. 2 illustrating another embodiment of the spigot end seal of the clay pipe of FIG. 2 in which a square section ring is used as a sealing member.
FIG. 5 is an enlarged sectional view of the upper portion of FIG. 2 illustrating still another embodiment of the spigot end seal of the clay pipe in which a finned ring is used as a sealing member.

Although the preferred sealing member is the O-ring 15 shown in FIGS. 1–3, other sealing means including a square section ring 40 (FIG. 4) and a finned-section ring 42 (FIG. 5) having a plurality of annular fins 43 that grip the associated socket end seal may be used to provide a water tight joint.

The purpose of shell 26 is to true up the generally out-of-round interior face of the bell or socket end of the pipe whereby a pipe of uneven dimensions is provided with a sealing ring of substantially true circular dimensions.

Using the novel hard plastic shell technique of the improved method of the present invention, joints for ring pipes may be made by providing complementary male and female seals, each seal comprising a thin hard annular plastic shell and a back up material that bonds the same to the associated pipe end. The male and female ends can be made into a waterproof joint by solvent welding or adhesive welding.

Although there are many tough, hard, resilient resin compositions which are suitable for the outer shell material of these novel seals, polypropylene and polyethylene have been found to be outstanding. These polyalkylene polymers are strong, light and, yet, have great impact strength as well as flexural strength. In this respect, the following properties of polyethylene and polypropylene are preferred:

| Properties | Polyethylene | Polypropylene |
| --- | --- | --- |
| Specific Gravity | 0.93 | 0.90 |
| Tensile Strength, p.s.i. | 1,000 | 4,200 |
| Percent Elongation | 100 | 300 |
| Compression Strength, p.s.i. | 2,000 | 9,000 |
| Flexural Strength, p.s.i. | 6,000 | 9,000 |
| Impact Strength, Izod, ft. lbs. | 3 | 3 |
| Hardness Shore | 60–70 D Scale | Rockwell 90 |

The back-up material 38 may be a synthetic resin composition of polyethylene and nonaromatic polydiene resin that is suitable for hot-melt application to the ends of clay pipe or other objects to be joined and contains a synthetic resin mixture of about as low as 5 to 10 or 15 up to as high as about 50% by weight of polyethylene and about 85 to 50% by weight of an aliphatic nonaromatic thermoplastic hydrocarbon polydiene resin derived from deep cracking of petroleum oils such as Piccopale, a thermoplastic hydrocarbon resin substantially devoid of aromatic material and generally having a bell and ring softening point of about 70 to 120° C. Another resin of the same type as Piccopale is Neville LX–1000.

Other ingredients of the above described composition, which is well adapted for use to form annular sealing joint members around ends of clay pipe, are fillers such as pulverized clay pipe grog, chopped or milled glass fibers, long fiber wollastonite (CaO.SiO$_2$), silica, coke, Potters flint or other well known fillers and extenders which are used to save the more expensive resin materials as well as to improve the weather resistance and compression set properties of the composition.

The sealing compositions of the present invention may be formed into desired shapes such as annular, toroidal sealing members for bell and spigot ends of clay pipes by positioning the thin plastic shells to radially space the same from their associated pipe ends and then using the preferred back-up material, heating and melting together the hydrocarbon resin and polyethylene at a temperature of about 375° to 525° F. to form a relatively low viscosity liquid and then cooling the liquid mixture to a temperature of about 150–200° F. to solidify the same and provide a solid, impact resistant, high tensile strength synthetic resin composition. The above liquid mixture can be poured into the cavity formed by the thin plastic shell around an end of a length of clay pipe and a solid seal formed in situ thereon without using pressure by merely cooling the mixture to solidify the same. The above technique may be used to produce joints at the factory without the use of expensive ovens, pumping equipment, etc.

Although some benefit can be obtained by the use of other water resistant back-up materials such as asphalts and polystyrene resins, by far the best seals are made when the backup materials are (1) hot melt synthetic resin compositions comprising polyethylene and a hydrocarbon polydiene resin or (2) a rigid foamed polyurethane material. Of the above two preferred materials, the hot melt synthetic resin has given the most satisfactory service in the field.

The following example is intended to illustrate the present invention and not to limit it in any way:

EXAMPLE

A series of pipe joint lengths were prepared for use in the field by applying seals thereto in accordance with the efficient and improved method of the present invention, the details of which are to follow.

A thin, tough, annular plastic shell of polypropylene that was made by rotational casting was positioned around the bottom of a length of vitrified clay sewer pipe, the bottom pipe end being a spigot end such as end 12 shown in the drawings. The shell such as shell 25, having a greater dimension than the spigot end of the pipe, was placed below the spigot pipe end and the pipe end inserted therewithin. Meanwhile, as the conveyor moved along to another station, another hard, thin, annular polypropylene shell, having a dimension less than the bell end of the clay pipe, was placed inside the upwardly directed bell end where it rested on the upper horizontal annular shoulder such as shoulder 22 in the drawings. The pipe was suspended from the moving conveyor by a suitable support plate, support bar and chain such as support plate 33, support bar 32, and chain 31 shown in FIG. 7. The shells of polypropylene were then bonded to the respective associated pipe ends to form an improved seal at each end as seen in FIGS. 1 and 2 by pouring a synthetic hot melt composition comprising 15 parts by weight of polyethylene and 85 parts by weight of a hydrocarbon polydiene resin (Piccopale 100) as previously described herein between each of said shells and their associated pipe walls to form a hard, tough, flexible, yet impact resistant and waterproof gasket therefor. The pipes were then ready for shipment without further protection. The pipes were joined together in the field with the aid of a neoprene O-ring such as O-ring 15 which was first inserted in a groove in the outer plastic shell surface of the spigot end seal. The pipes were then pushed together to compress the O-ring and form an excellent waterproof seal.

It is understood that in accordance with the provisions of the patent statutes, the particular methods shown are presented for purposes of explanation and illustration and that various modifications of said methods may be made without departing from my invention.

What is claimed is:

1. A method of making a seal for pipe joints comprising the steps of (1) positioning a single unitary annular thin hard tough shell of plastic material in radial spaced relationship with one end of a pipe length for forming a seal for connection with other pipes, said shell extending the full axial length of the seal, (2) applying a pourable water resistant composition between said shell and its associated pipe end, and (3) solidifying and permanently bonding said composition to the shell and to the pipe end and thereby form a strong water resistant seal on said pipe end.

2. A method as defined in claim 1 in which the plastic material is a polyalkylene in which the alkylene radical has 2 to 3 carbon atoms and the pourable composition comprises a hot-melt synthetic resin mixture of polyethylene and a thermoplastic nonaromatic polydiene resin derived from the polymerization of aliphatic unsaturated products comprising diolefins and monoolefins from the cracking of petroleum oil and having a ball and ring softening point of about 70° to 120° C.

3. A method as defined in claim 2 in which the pourable composition comprises 5 to 50 parts by weight of polyethylene and 50 to 95 parts by weight of polydiene resin.

4. A method as defined in claim 1 in which the plastic material is a polyalkylene in which the alkylene radical has 2 to 3 carbon atoms and the pourable composition comprises polyurethane-forming ingredients including a polyol, a polyisocyanate and a blowing agent for forming a rigid foamed polyurethane material.

References Cited

UNITED STATES PATENTS

| | | | |
|---|---|---|---|
| 2,911,683 | 11/1959 | Palermo et al. | 264—262 |
| 2,955,322 | 10/1960 | Hite | 264—267 |
| 3,151,195 | 9/1964 | Lafferty | 264—262 |

ROBERT F. WHITE, *Primary Examiner.*

F. MARLOWE, L. S. SQUIRES, T. J. CARVIS,
*Assistant Examiners.*